United States Patent
Sankrithi

(10) Patent No.: US 6,834,833 B2
(45) Date of Patent: Dec. 28, 2004

(54) TWIN AISLE SMALL AIRPLANE

(75) Inventor: Mithra M. K. V. Sankrithi, Federal Way, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/969,801

(22) Filed: Oct. 2, 2001

(65) Prior Publication Data

US 2003/0062449 A1 Apr. 3, 2003

(51) Int. Cl.[7] ............................................. B64C 1/00
(52) U.S. Cl. .................. 244/119; 244/118.1; 244/118.6
(58) Field of Search .................... 244/13, 36, 117 R, 244/118.1, 118.5, 118.6, 119, 130; D12/319, 337, 343, 333

(56) References Cited

U.S. PATENT DOCUMENTS

| | | | | |
|---|---|---|---|---|
| 3,405,893 A | * | 10/1968 | Flamand et al. ............ | 244/119 |
| 3,854,679 A | * | 12/1974 | Smethers, Jr. .............. | 244/119 |
| 4,030,688 A | * | 6/1977 | Pellarini ..................... | 244/36 |
| 4,674,712 A | * | 6/1987 | Whitener et al. ........... | 244/119 |
| 4,799,631 A | * | 1/1989 | Humphries et al. ........ | 244/119 |
| 5,086,996 A | * | 2/1992 | Roeder et al. .............. | 244/119 |
| 5,115,999 A | * | 5/1992 | Buchsel et al. ............. | 244/119 |
| 5,769,358 A | * | 6/1998 | Hahl et al. .................. | 244/36 |
| 5,893,535 A | * | 4/1999 | Hawley ...................... | 244/119 |
| 6,012,679 A | * | 1/2000 | Auestad .................... | 244/118.6 |
| 6,070,831 A | * | 6/2000 | Vassiliev et al. ............ | 244/120 |
| 6,098,922 A | | 8/2000 | Hahl .......................... | 244/36 |
| 6,378,803 B1 | * | 4/2002 | Saiz ........................... | 244/36 |
| 6,446,908 B1 | * | 9/2002 | Saiz ........................... | 244/45 R |

* cited by examiner

*Primary Examiner*—Galen Barefoot
(74) *Attorney, Agent, or Firm*—Black Lowe & Graham PLLC

(57) ABSTRACT

A less-than-200-seat-class passenger airplane includes a passenger cabin with two longitudinal aisles, and at least six economy class seats abreast the cabin. The cross-section of the cabin perpendicular to a longitudinal axis of the airplane fuselage has a horizontal diameter value in excess of a vertical diameter value.

21 Claims, 9 Drawing Sheets

US 6,834,833 B2

TWIN AISLE SMALL AIRPLANE

FIELD OF THE INVENTION

This invention relates generally to airplanes and, more specifically, to passenger airplane configurations.

BACKGROUND OF THE INVENTION

Current "small" commercial airplanes such as the Boeing 737 and 717, the Airbus A320 family, and regional jets in the less-than-100-seat class being designed by Bombardier, Embraer and Fairchild Dornier, all feature a passenger cabin with a single-aisle. A single-aisle configuration used in current airplanes in these smaller classes minimizes drag, weight, fuel bum, and economic penalties. However, the single-aisle fails to provide spacious cabins, desirable ambiance and interior architecture, and easy mobility in flight for both passengers and cabin crew. As a result, the passenger appeal of single-aisle aircraft is significantly less than that of larger twin-aisle aircraft.

Current larger commercial airplanes such as the Boeing 747, 767, and 777, and the Airbus A340 family feature a passenger cabin with a twin-aisle. A twin-aisle configuration used in current airplanes in these larger classes provides increased passenger comfort over a single-aisle configuration.

Due to economic and performance constraints, small aircraft currently known in the art are limited to single-aisle configurations at the expense of increased passenger comfort, such as that available in twin-aisle configurations. Therefore, there exists a need to improve passenger comfort in small commercial aircraft while minimizing drag, weight penalties, fuel burn, and economic penalties.

SUMMARY OF THE INVENTION

The present invention provides a twin-aisle small airplane. The airplane of the present invention provides the passenger comfort of a twin-aisle configuration that is usually only provided by airplanes in larger classes. At the same time, the airplane of the present invention minimizes drag, weight penalties, fuel burn, and economic penalties.

A less-than-200-seat-class passenger airplane includes a passenger cabin with two longitudinal aisles, and at least six economy class seats abreast the cabin. The cross-section of the cabin perpendicular to a longitudinal axis of the airplane fuselage has a horizontal diameter value in excess of a vertical diameter value.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
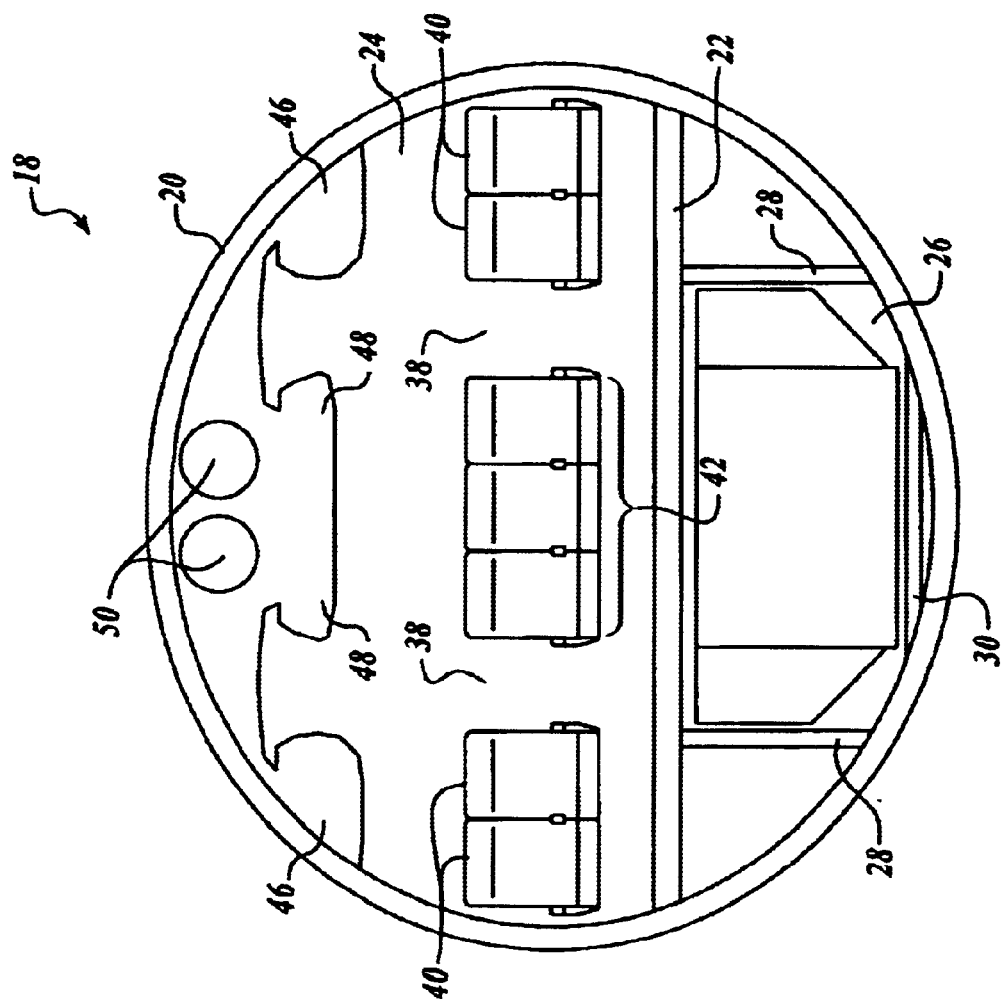
FIG. 1 is a cross-section view of an airplane formed in accordance with the present invention.

The present invention provides a twin-aisle cabin interior in an efficient configuration of a small airplane 18. As shown in FIG. 1, a horizontal oval fuselage 20 is implemented in a small airplane configuration. Shown in FIG. 1 is a cabin deck 22 that separates a passenger cabin 24 from a cargo compartment 26 defined by sidewalls 28 and a floor 30. The passenger cabin 24 preferably accommodates seven economy seats abreast in a 2-3-2 arrangement (outboard groups of two seats 40, and an inboard group of three seats 42) with two aisles 38 separating the groups. Other embodiments may have six seats abreast in a 2-2-2 configuration, or eight abreast in 2-4-2 configuration. In one embodiment the seat bottom width is 18.5 inches (777 comfort level) and aisle widths are 19 inches. Head, shoulder, armrest, and foot level clearances from outboard seat centerline to the cabin sidewall also meet typical payload criteria for an outboard seat passenger. Air ducts 50 are located at the top of the fuselage 20 above central stowage bins 48 that are located above the inboard group of seats 42. Outboard stowage bins 46 are positioned above the respective outboard groups of seats 40. The cargo compartment 26 is sized to receive containerized cargo called Unit Load Devices (ULDs), such as LD3-46 containers, or "two-winged" variants of LD3-46 containers.

In one embodiment, the oval fuselage 20 has a width of about 201 inches and a height of about 187 inches, and uses an elliptical perimeter geometry. Somewhat different dimensions, and/or non-elliptical ovals with width exceeding height, could also be used within the spirit and scope of the invention. The perimeter of this example cross-section is 609.7 inches, and the perimeter per seat is 87.1 inches per seat. The cross-section perimeter value is virtually identical to that of a conventional single-aisle 6-abreast cross-section which also accommodates similar comfort seats and LD3-46 containers in the lower deck. The cross-sectional area of an example of a 7-abreast, twin-aisle "small" airplane according to the present invention is 206.3 sq. ft., or 29.5 sq. ft. per seat.

Figure 2:
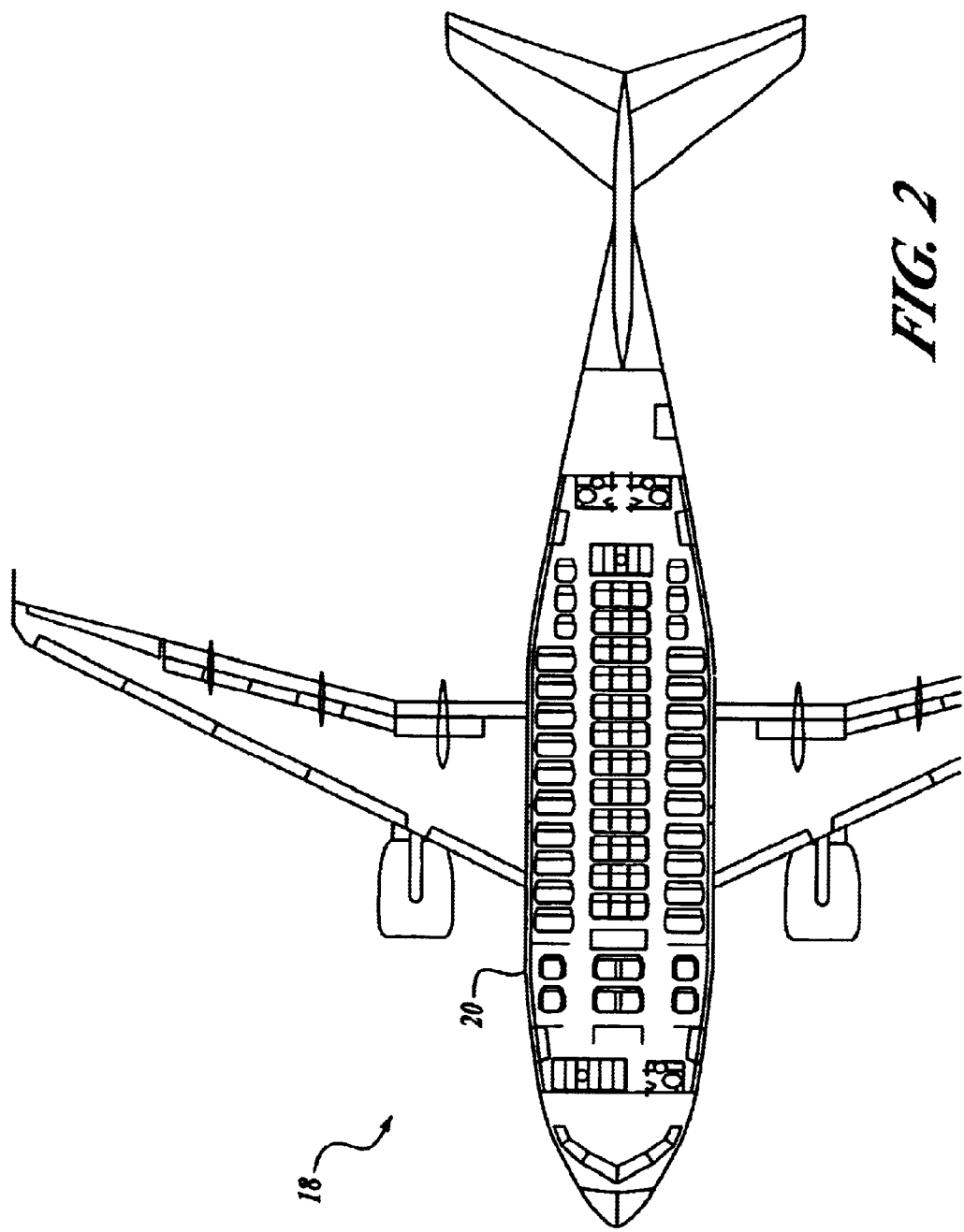
FIGS. 2 and 3 are x-ray top views of the airplane shown in FIG. 1.
Figure 3:
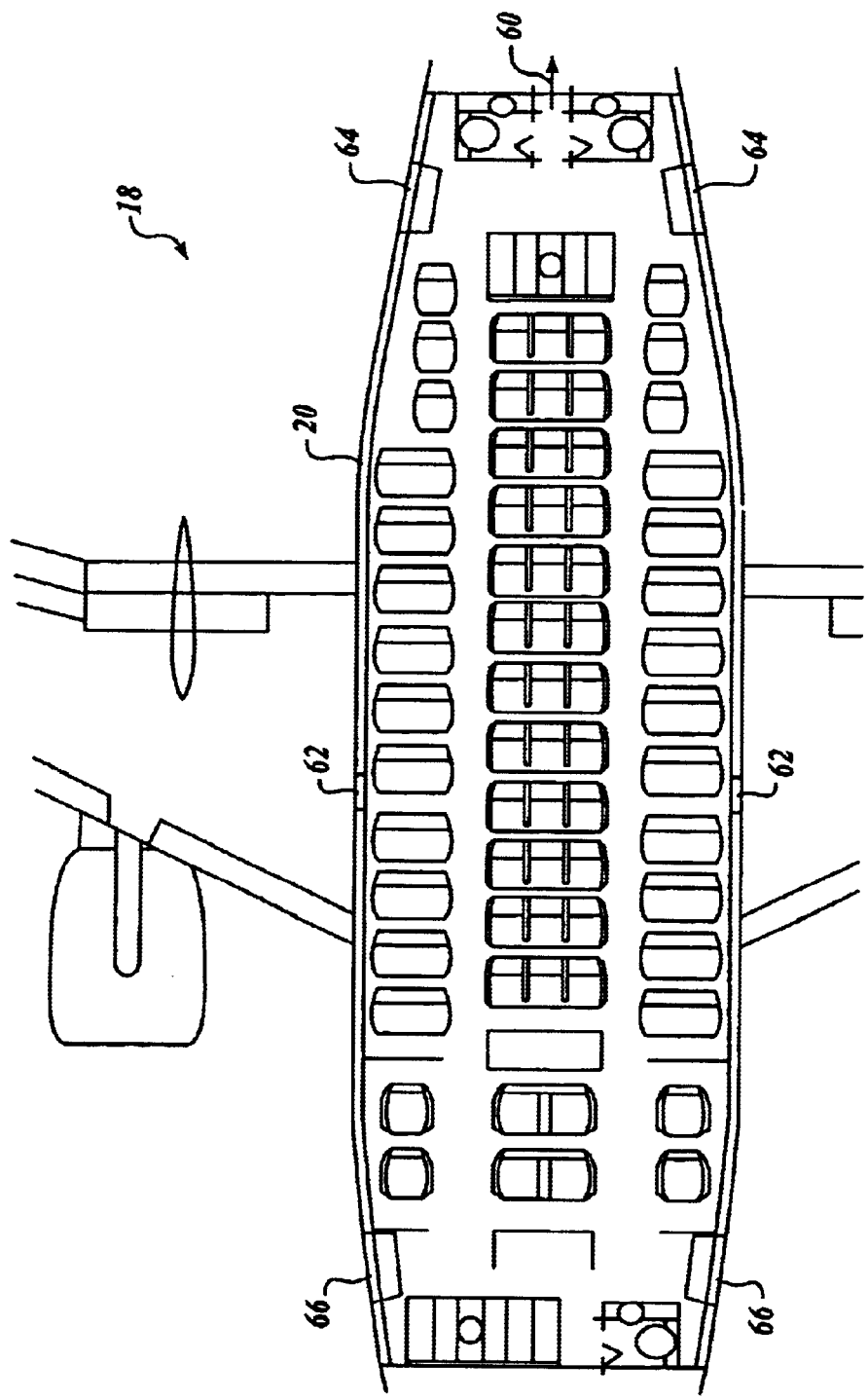

FIGS. 2 and 3 show x-ray top views of a 90-seat, dual-class, 7-abreast economy class, twin-aisle configuration of the airplane 18 shown in FIG. 1. The fuselage 20 includes two forward passenger cabin doors 66, two aft passenger cabin doors 64, and emergency window exits 62 located over the wings. In another embodiment, the fuselage 20 includes an aft exit 60 located approximately on the airplane's centerline. However, the aft exit 60 could be located at other positions depending upon cabin layout. FIGS. 2 and 3 also show a representative 4-abreast twin-aisle first or Business Class seating zone at the front of the cabin, and representative galley and lavatory installations.

Figure 4:
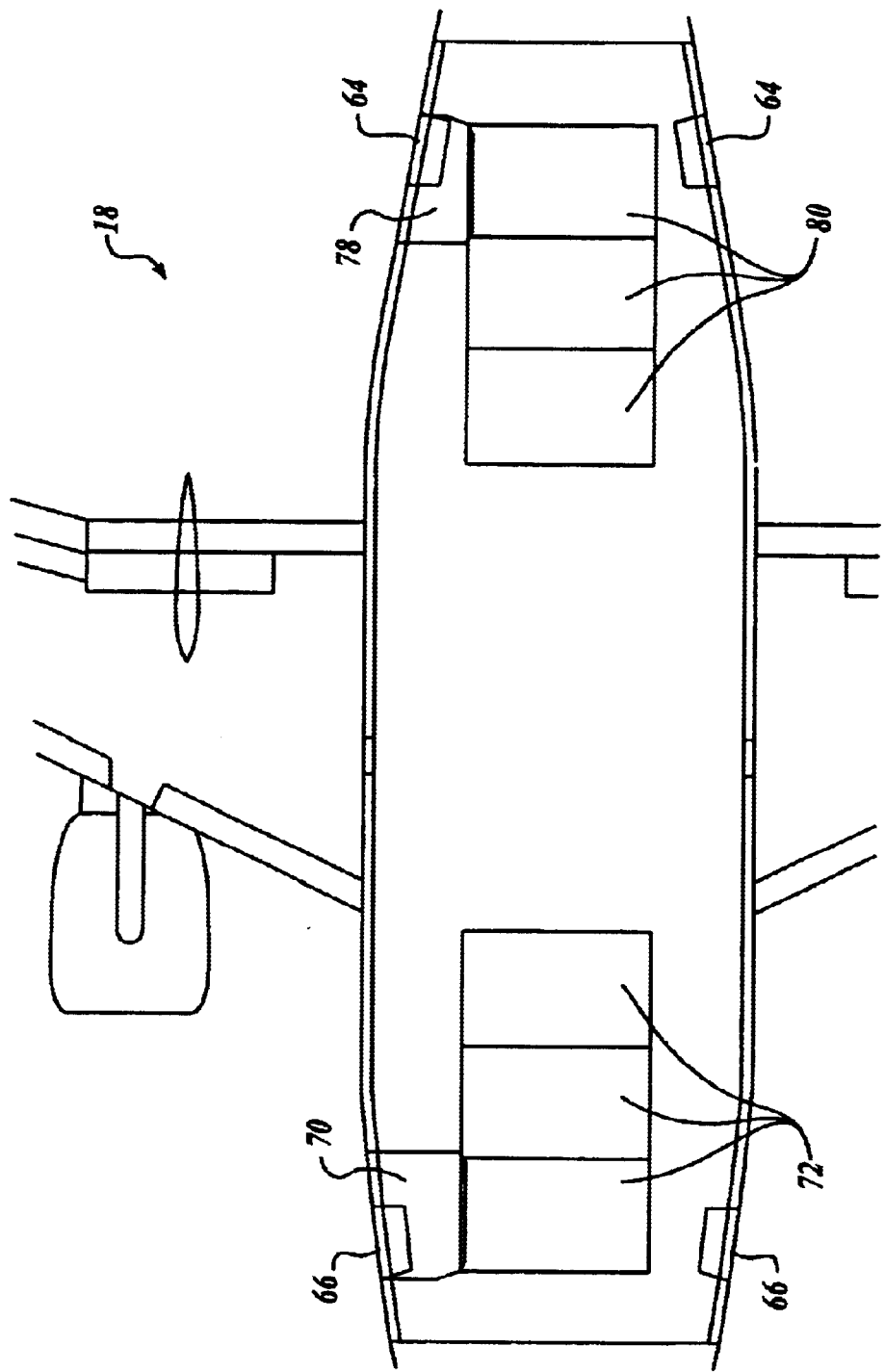
FIG. 4 is an x-ray top view of the airplane from FIG. 1 showing cargo compartments.
Figure 5:
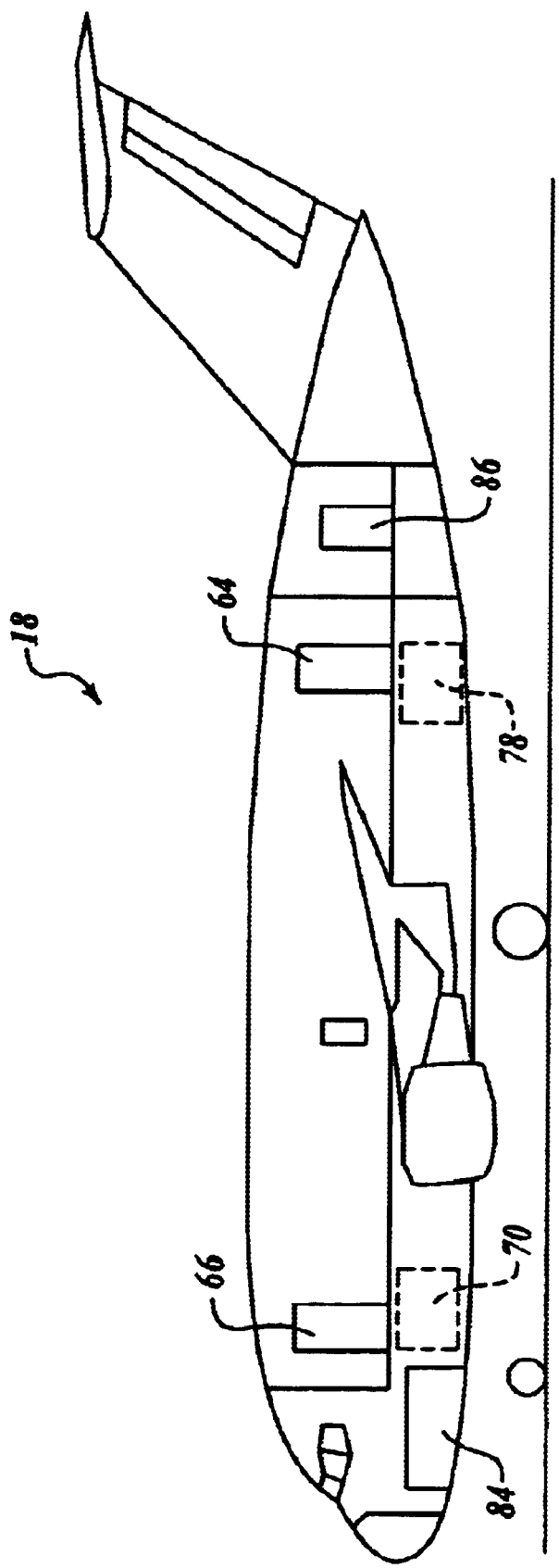
FIG. 5 is a side view of the airplane from FIG. 1.

FIGS. 4 and 5 show the airplane 18 with a forward cargo door 70 located below the forward starboard passenger door 66. The forward cargo door 70 provides access to a forward cargo compartment 72. Also shown is an aft cargo door 78 located below the aft starboard passenger door 64. The aft cargo door 78 provides access to an aft cargo compartment 80. FIG. 5 shows the airplane 18 with a bulk cargo hold door 86 located aft of the passenger cabin 24. The bulk cargo hold door 86 provides access to a bulk cargo hold. Copending U.S. patent application Ser. No. (pending), attorney docket no. BOEI-1-1015, filed Oct. 2, 2001, hereby incorporated by reference, discloses cargo-loading means suitable for the airplane configuration described above.

Figure 6:
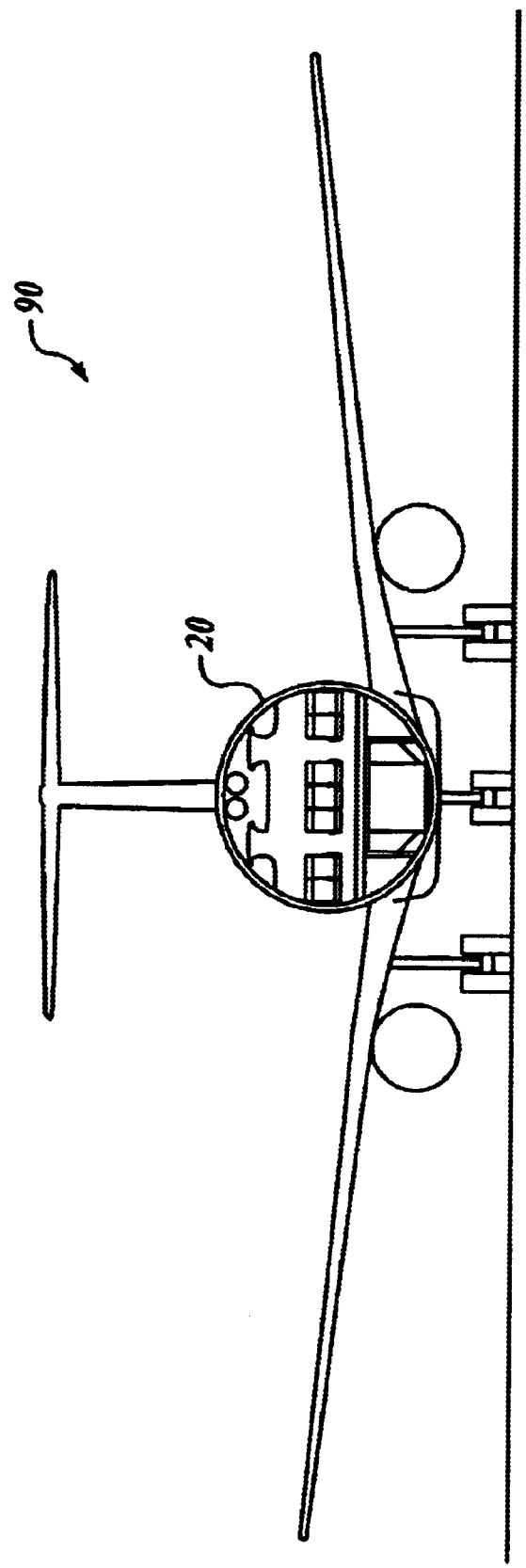
FIGS. 6 and 7 are cross section front views of the airplane from FIG. 1.

As shown in FIG. 6, an airplane 90 includes a T-tail configuration is shown for providing a greater lever arm to the horizontal tail. A low tail or other tail configuration could be used in alternate embodiments of the invention.

Figure 7:
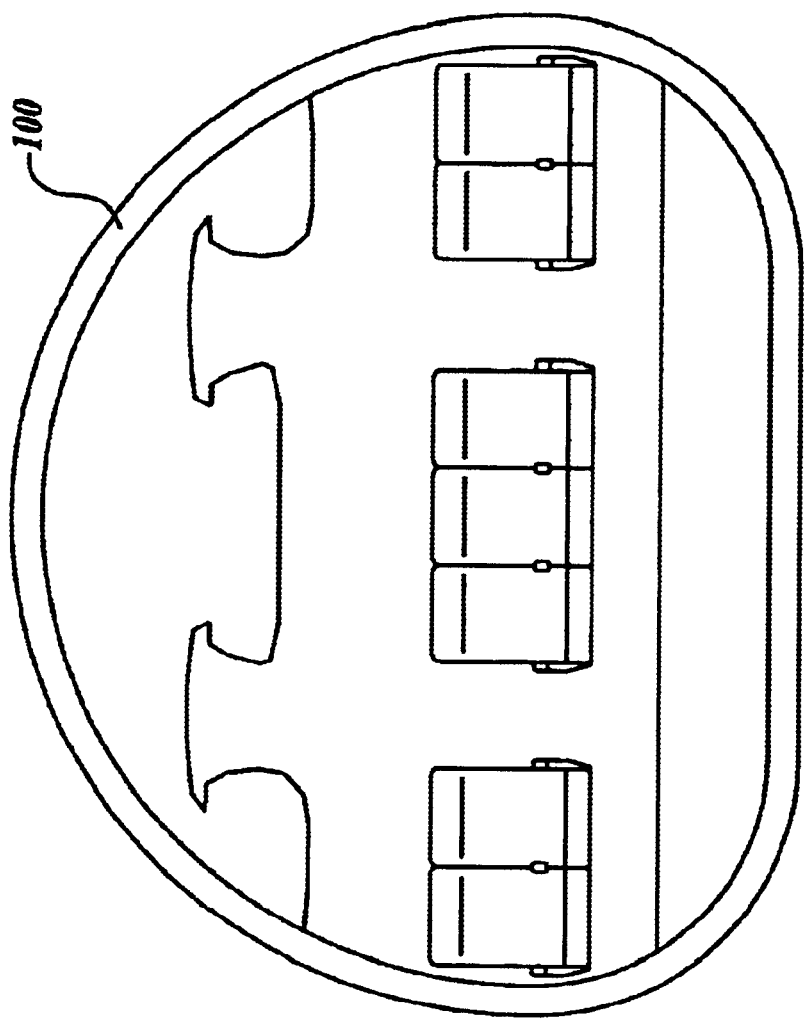

FIG. 7 shows a cross-section of an alternate fuselage 100, which utilizes a flat underside to the fuselage cross-section. The perimeter of the fuselage 100, with 7 seats abreast, is less than that of the fuselage shown in FIG. 1, and thus provides less room for containerized cargo below the passengers cabin. The reduced perimeter further reduces aerodynamic drag, at the cost of cargo capacity.

Figure 8:
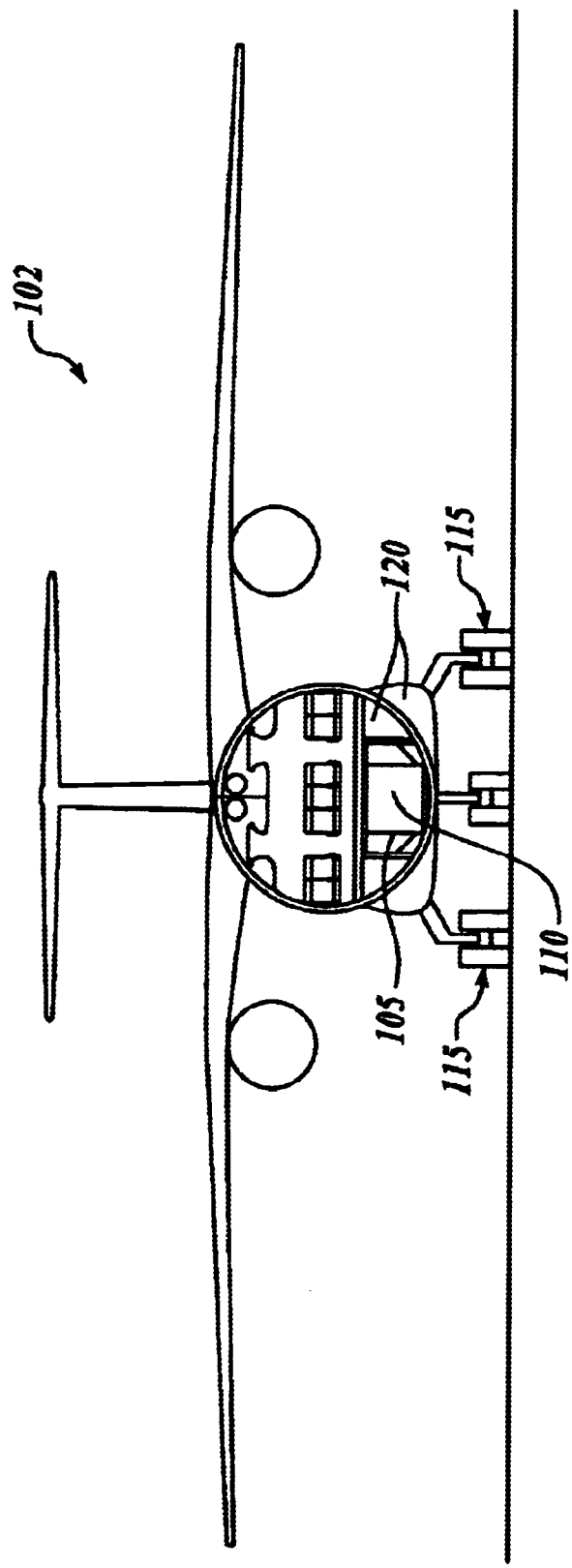
FIG. 8 is a cross-section front view of an airplane formed in accordance with an alternate embodiment of the present invention.

FIG. 8 shows a front view of a high-wing airplane 102 with a similar cross-section as that of the airplane 18 shown in FIG. 1. In this embodiment, a cargo compartment 105 receives cargo containers (e.g., LD3-46) rotated sideways (90 degrees from that shown in FIG. 1). The cargo compartment 105 travels the full length of the lower deck without having a break for a wing box or landing gear wheel well. Main landing gear 115 retracts into fairings 120 on either side of the cargo compartment 105.

Figure 9:
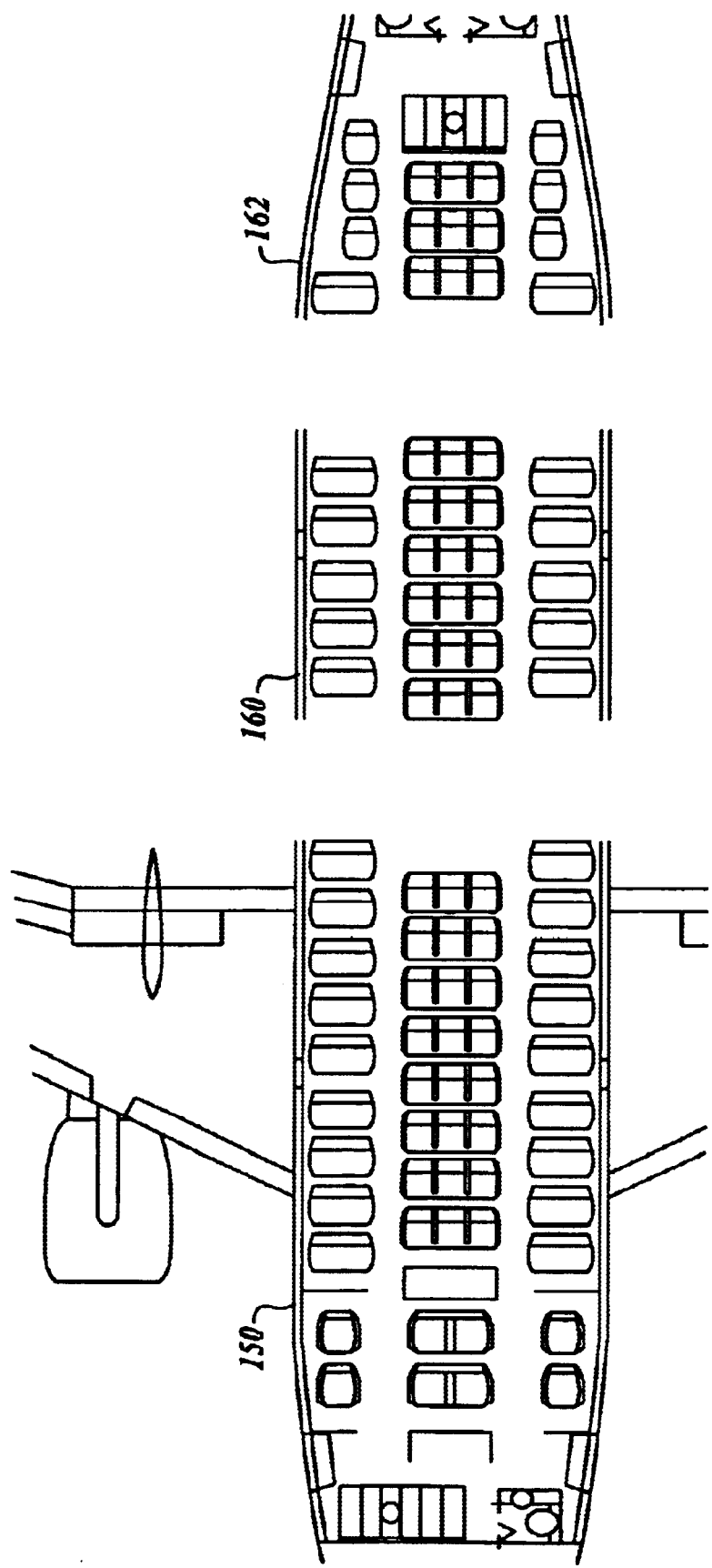
FIG. 9 illustrates an alternate embodiment of the present invention.

In an alternate embodiment, as shown in FIG. 9, the present invention provides a section 150 of the fuselage with a substantially constant cross-section for a short distance forward of and immediately behind the wing. As a result, this airplane configuration can conveniently be "stretched" into longer body models by adding the constant cross-section sections 160 ahead of or behind the wing. Section 162 is a tail section that connects to the main section 150 or any numbered additional section 160. A single size wing platform can accommodate fuselages with up to a certain number and size of constant cross-section fuselage sections. For example, a first wing platform accommodates bodies corresponding to 90, 105, and 120 dual-class seats. A second wing platform accommodates bodies corresponding to 135, 160, and 185 seats, and a third wing platform accommodates bodies corresponding to 210, 250, and 290 seats. In the longer body versions, structure is strengthened, more doors are provided in the constant cross-section fuselage sections, and bigger engines are used as required to meet payload-range mission requirements. Thus, this new twin-aisle "small" airplane cross-section could apply to a very large family of airplanes from around the 90 seat regional jet class all the way through the 757 and 767 "middle of the market" class.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A passenger airplane having a fuselage, the airplane comprising:
    a fuselage having a portion with a substantially constant cross-section; and
    wings coupled to the fuselage;
    wherein the cross-section being noncircular and having a horizontal diameter value in excess of a vertical diameter value,
    wherein the portion with the substantially constant cross-section accommodates an interior arrangement including two aisles approximately parallel to a longitudinal axis of the fuselage and including a plurality of rows of seats, two or more of the rows include at least six seats, each seat being at least 17 inches wide,
    wherein a distance between a topmost point of the fuselage to a closest point of a line corresponding to the horizontal diameter value is less than half of the horizontal diameter value,
    wherein a distance between a bottommost point of the fuselage to a closest point of the line corresponding to the horizontal diameter value is less than half of the horizontal diameter value,
    wherein the portion with the substantially constant cross-section accommodates a cargo compartment located below the interior arrangement, the cargo compartment being configured to accommodate cargo containers up to 64 inches in height,
    wherein a ratio of the horizontal diameter value to the vertical diameter value is greater than or equal to 1.01 and less than or equal to 1.30.

2. The passenger airplane of claim 1, further comprising at least two engines.

3. The passenger airplane of claim 1, wherein the wing interfaces with the fuselage below the interior arrangement.

4. The passenger airplane of claim 1, further comprising an empennage including a vertical tail and a horizontal tail.

5. The passenger airplane of claim 1, wherein the portion with the substantially constant cross-section is at least one third the length of the fuselage.

6. The passenger airplane of claim 1, wherein a perimeter of the portion with the substantially constant cross-section does not include any outwardly concave portions.

7. The passenger airplane of claim 1, wherein one or more of the plurality of rows of seats includes at least seven seats, each seat being at least 17 inches wide.

8. The passenger airplane of claim 1, wherein each of the two aisles are at least 17 inches wide.

9. The passenger airplane of claim 1, wherein each of the two aisles are at least 75 inches from a floor to a ceiling of the interior arrangement.

10. The passenger airplane of claim 1, wherein the interior arrangement includes at least two substantially longitudinally-oriented columns of storage bins positioned above the seats.

11. The passenger airplane of claim 1, wherein the cargo compartment being configured to accommodate cargo containers up to 46 inches in height.

12. The passenger airplane of claim 1, wherein the interior arrangement is configured to seat less that 200 passengers when at capacity.

13. The passenger airplane of claim 1, wherein the cargo compartment being configured to accommodate one or more LD3-46 unit load devices.

14. The passenger airplane of claim 1, wherein the cargo compartment being configured to accommodate one or more LD3-46W unit load devices.

15. The passenger airplane of claim 1, wherein the interior arrangement includes a crown area above the seats, the crown area includes interior environmental components.

16. The passenger airplane of claim 1, wherein the interior arrangement comprises seven economy class seats abreast, arranged in a 2-3-2 configuration inboard and outboard of the two longitudinal aisles.

17. The passenger airplane of claim 16, wherein the economy class seats have seat bottom widths of at least 18 inches.

18. The passenger airplane of claim 1, wherein the portion with the substantially constant shape.

19. The passenger airplane of claim 1, further comprising a bulk cargo compartment substantially aft of the interior arrangement.

20. The passenger airplane of claim 1, wherein the fuselage includes a substantially flat bottom surface.

21. The passenger airplane of claim 1, wherein said cross-section is substantially elliptical in shape, with a substantially horizontal major axis having a length equal to the horizontal diameter value, and a substantially vertical minor axis having a length equal to the vertical diameter value.

* * * * *